US011133637B2

(12) United States Patent
Helle

(10) Patent No.: US 11,133,637 B2
(45) Date of Patent: Sep. 28, 2021

(54) APPARATUS AND METHOD FOR TUNABLE FREQUENCY PARAMETRIC DOWN-CONVERSION OF HIGH PEAK POWER LASERS THROUGH DUAL CHIRP PULSE MIXING

(71) Applicant: The Government of the United States of America, as represented by the Secretary of the Navy, Arlington, VA (US)

(72) Inventor: Michael H. Helle, Arlington, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 46 days.

(21) Appl. No.: 16/662,166

(22) Filed: Oct. 24, 2019

(65) Prior Publication Data
US 2020/0136335 A1 Apr. 30, 2020

Related U.S. Application Data

(60) Provisional application No. 62/750,845, filed on Oct. 26, 2018.

(51) Int. Cl.
*H01S 3/00* (2006.01)
*G02F 1/39* (2006.01)
*H01S 3/11* (2006.01)

(52) U.S. Cl.
CPC .............. *H01S 3/0057* (2013.01); *G02F 1/39* (2013.01); *G02F 1/392* (2021.01); *H01S 3/0085* (2013.01); *H01S 3/1106* (2013.01)

(58) Field of Classification Search
CPC ...................................................... G02F 1/392
See application file for complete search history.

(56) References Cited

U.S. PATENT DOCUMENTS

| 5,400,350 A | 3/1995 | Galvanauskas |
| 2003/0128423 A1* | 7/2003 | Jovanovic ................. G02F 1/39 |
| | | 359/349 |

FOREIGN PATENT DOCUMENTS

| CN | 106329302 A | * 1/2017 |
| EP | 2924500 B1 | 9/2015 |

OTHER PUBLICATIONS

Fu et al. ("Optimization and characterization of dual-chirped optical parametric amplification", 2015 J. Opt. 17 124001) (Year: 2015).*
A. P. Piskarskas, A. P. Stabinis and V. Pyragaite, "Ultrabroad Bandwidth of Optical Parametric Amplifiers," in IEEE Journal of Quantum Electronics, vol. 46, No. 7, pp. 1031-1038, (2010).
D. Strickland and G. Mourou, "Compression of amplified chirped optical pulses", Opt. Commun. 56, 219 (1985).
I. N. Ross, P. Matousek, M. Towrie, A. J. Langley, and J. L. Collier, "The prospects for ultrashort pulse duration and ultrahigh intensity using optical parametric chirped pulse amplifiers," Optics Communications 144, Issues 1-3 (1997).

(Continued)

*Primary Examiner* — Tod T Van Roy
(74) *Attorney, Agent, or Firm* — US Naval Research Laboratory; Joslyn J. Barritt

(57) ABSTRACT

A laser architecture for selectively producing short high-energy laser pulses having octave-spanning, continuous tunability. Two oppositely chirped pulses are used in combination with a pair of tunable pulse stretcher/compressors to produce a short, high-energy, tunable, broadband pulse.

2 Claims, 8 Drawing Sheets

(56) References Cited

OTHER PUBLICATIONS

Ferenc Krausz and Misha Ivanov, "Attosecond Physics," Rev. Mod. Phys. 81, 163 (2009).
Qingbin Zhang et al., "Dual-chirped optical parametric amplification for generating few hundred mJ infrared pulses," Optics Express, vol. 19, No. 8, pp. 7190-7212 (2011).
Yuxi Fu et al., "Generation of a 200-mJ class infrared femtosecond laser by dual-chirped optical parametric amplification," Conference on Lasers and Electro-Optics, OSA Technical Digest (online) (Optical Society of America, (2017), paper SM3I.3.
Yuxi Fu et al., "Towards a petawatt-class few-cycle infrared laser system via dual-chirped optical parametric amplification," Scientific Reports 8, Article No. 7692 (2018).
Yuxi Fu et al., "Generation of high-energy mid-infrared pulses at 3.3 μm by dual-chirped optical parametric amplification," Conference on Lasers and Electro-Optics, OSA Technical Digest (online) (Optical Society of America, 2018), paper SF1N.5.
M. P. Kalashnikov, K. Osvay, I. M. Lachko, H. Schonnagel and W. Sandner, "Broadband amplification of 800-nm pulses with a combination of negatively and positively chirped pulse amplification," in IEEE Journal of Selected Topics in Quantum Electronics, vol. 12, No. 2, pp. 194-200, (2006).
Jiun-Cheng Wang and Juen-Kai Wang, "Experimental and theoretical analysis of white-light seeded, collinear phase-matching, femtosecond optical parametric amplifiers," J. Opt. Soc. Am. B 21,45-56 (2004).
E. Treacy, "Optical pulse compression with diffraction gratings," in IEEE Journal of Quantum Electronics, vol. 5, No. 9, pp. 454-458 (1969).

\* cited by examiner

APPARATUS AND METHOD FOR TUNABLE FREQUENCY PARAMETRIC DOWN-CONVERSION OF HIGH PEAK POWER LASERS THROUGH DUAL CHIRP PULSE MIXING

CROSS-REFERENCE

This Application is a Nonprovisional of and claims the benefit of priority under 35 U.S.C. § 119 based on U.S. Provisional Patent Application No. 62/750,845 filed on Oct. 26, 2018. The Provisional Application and all references cited herein are hereby incorporated by reference into the present disclosure in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #108181.

TECHNICAL FIELD

The present invention provides a high efficiency, tunable, high-contrast, broad-bandwidth laser amplifier with carrier envelope phase locking that can enable the generation of short high-power laser pulses at wavelengths where appropriate gain materials do not exist.

BACKGROUND

High-peak-power lasers are the driving technology behind fields such as laser machining, fs-chemistry, and next generation particle accelerators and light sources to name a few. While many areas require specific operational wavelengths, to for instance excite a material resonance, existing lasing materials only operate at specific wavelength, limiting utility. The added requirements for certain applications of high repetition rates, and thus high average powers introduces further technical challenges.

It often is desirable to convert an initial laser pulse having an initial frequency, initial power, and initial temporal duration into a pulse having one or more of a higher energy, a different wavelength, or a different temporal duration.

One method known in the art for doing do converts the initial pulse using a nonlinear material in a method known as optical parametric amplification (OPA). See M. Ghotbi, V. Petrov and F. Noack, "Generation of tunable, ultrashort pulses in the near-IR with an OPA system based on BIBO," *CLEO/QELS:* 2010 *Laser Science to Photonic Applications*, pp. 1-2. San Jose, Calif., (2010); and A. P. Piskarskas, A. P. Stabinis and V. Pyragaite, "Ultrabroad Bandwidth of Optical Parametric Amplifiers," in *IEEE Journal of Quantum Electronics*, vol. 46, no. 7, pp. 1031-1038, (2010); see also EP 2924500 B1 to EKSPLA entitled "Method for generation of femtosecond light pulses, and laser source thereof."

The block schematic shown in FIG. 1 illustrates aspects of this OPA process. As shown in FIG. 1, in OPA, an initial signal pulse having a frequency $\omega_s$ and a pump pulse having a frequency $\omega_p$ are input into a second-order nonlinear crystal NC, where the signal pulse is amplified under a difference frequency or optical parametric amplification arrangement. The signal pulse and pump pulses combine in the nonlinear crystal NC to produce an idler pulse having a frequency $\omega_i$ such that $\omega_p = \omega_s + \omega_i$ and $\omega_s > \omega_i$. In addition, beam energy from the pump pulse amplifies the initial signal pulse so as to produce an amplified signal pulse having the same frequency as the initial signal pulse but additional energy provided by the pump pulse. The idler pulse, the amplified signal pulse, and the pump pulse (which, per the principles of energy conservation, now has lower energy than it had before) are then output from the nonlinear crystal NC. Thus, because the frequency of the idler pulse depends on the frequency of both the signal pulse and the pump pulse, by tuning the pump pulse, a desired idler pulse can be produced from a given signal pulse.

In this scheme, the high peak powers require large beam sizes to keep intensities below the nonlinear material's damage threshold. Additionally, short propagation distances are necessary to maintain phase matching and prevent walk-off. These two requirements can be difficult or impossible to meet either from a mechanical or material growth point of view.

Another method for converting an initial optical pulse having an initial frequency, initial power, and initial temporal duration uses a high-energy, long pulse narrowband laser to amplify a low-energy broadband pulse though an optical parametric chirped pulse amplification (OP-CPA) scheme. See D. Strickland and G. Mourou, "Compression of amplified chirped optical pulses", *Opt. Commun.* 56, 219 (1985); and I. N. Ross, P. Matousek, M. Towrie, A. J. Langley, and J. L. Collier, The prospects for ultrashort pulse duration and ultrahigh intensity using optical parametric chirped pulse amplifiers, *Optics Communications* 144, Issues 1-3 (1997); see also U.S. Pat. No. 5,400,350 to Galvanauskas entitled "Method and Apparatus for Generating High Energy Ultrashort Pulses."

The block schematic in FIG. 2 illustrates aspects of an exemplary implementation of this OP-CPA scheme. As illustrated in FIG. 2, in such a scheme, a short, low-energy broadband signal pulse, typically having a pulse duration of about 100 fs, is input into a positive pulse stretcher, which lengthens the temporal duration of the pulse by about three orders of magnitude, or to about 100 ps. Once the initial signal pulse has been so stretched, the signal is combined with a high energy narrowband pump pulse, often having a pulse duration of about 1 ns, and both pulses are input into a nonlinear crystal (NC). As in the OPA scheme illustrated in FIG. 1, the signal pulse and pump pulses combine in the nonlinear crystal NC to produce an idler pulse and an amplified signal pulse as described above. The amplified signal pulse is then input into a negative compressor, which shortens the pulse duration from its stretched duration of about 100 ps to a compressed duration of about 100 fs to produce a final short high-energy pulse that is output from the pulse amplifier system. The idler pulse and any remaining energy from the pump pulse is removed from amplifier system and their energy is absorbed by an optical beam dump.

In this OP-CPA scheme, the short low-energy broadband pulse is temporally stretched through the addition of a linear chirp by a pulse stretcher. This long, chirped pulse is then mixed with and amplified by a long high energy pump pulse in a nonlinear material. The linear chirp is then removed by a pulse compressor producing a final short high energy pulse. Formation of the long pulse reduces beam intensities and thus the demands placed on the nonlinear amplifier material. However, the nonlinear mixing process reduces the bandwidth of the pulse, thus increasing the minimum achievable pulse length. Additionally, since the pulses are generated separately, there is typically no tunability in the generated pulse and no straightforward way to achieve carrier-envelope phase (CEP) locking. See Ferenc Krausz and Misha Ivanov, "Attosecond Physics," *Rev. Mod. Phys.* 81, 163 (2009).

Yet another method for generating a high-energy laser pulse uses dual-chirped optical parametric amplification (DC-OPA). In this method, a pump pulse having a positive chirp and a seed pulse having a negative chirp are mixed to produce an idler pulse with a positive chirp. The chirp is then removed from the idler producing an even shorter pulse. See Qingbin Zhang et al., "Dual-chirped optical parametric amplification for generating few hundred mJ infrared pulses," *Optics Express*, Vol. 19, No. 8, pp. 7190-7212 (2011); see also Yuxi Fu et al., "Generation of a 200-mJ class infrared femtosecond laser by dual-chirped optical parametric amplification," *Conference on Lasers and Electro-Optics*, OSA Technical Digest (online) (Optical Society of America, 2017), paper SM3I.3; Yuxi Fu et al., "Towards a petawatt-class few-cycle infrared laser system via dual-chirped optical parametric amplification," *Scientific Reports* 8, Article number: 7692 (2018); and Yuxi Fu et al., "Generation of high-energy mid-infrared pulses at 3.3 μm by dual-chirped optical parametric amplification," *Conference on Lasers and Electro-Optics*, OSA Technical Digest (online) (Optical Society of America, 2018), paper SF1N.5. Other methods produce use chirped pulse amplification to amplify negatively and positively chirped pulses. See M. P. Kalashnikov, K. Osvay, I. M. Lachko, H. Schonnagel and W. Sandner, "Broadband amplification of 800-nm pulses with a combination of negatively and positively chirped pulse amplification," in *IEEE Journal of Selected Topics in Quantum Electronics*, vol. 12, no. 2, pp. 194-200, (2006).

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a new laser architecture, known as Dual Chirp Optical Parametric Chirped Pulse Amplification (DC-OPCPA), for selectively producing short high-energy laser pulses having octave-spanning, continuous tunability. Unlike the prior art techniques for pulse amplification discussed above, in accordance with the present invention, two oppositely chirped pulses are used in combination with a pair of the novel tunable pulse stretcher/compressors of the present invention to produce a short, high-energy, tunable, broadband pulse.

The envisioned mode of operation is that for signal amplification that a positive chirp is applied, the signal is amplified and then recompressed. For idler amplification, a negative chirp is applied to the signal, that generates an amplified positively chirped idler, and then the idler is compressed.

A tunable DC-OPCPA system in accordance with the present invention requires (1) a broad-bandwidth, ultrashort seed pulse and (2) a tunable pulse stretcher and compressor to access the various operational wavelengths. The seed pulse can be provided by means of supercontinuum generation, wherein a small portion of an initial high energy broadband pump pulse can be compressed to generate a low energy ultrashort pulse. This ultrashort pulse can be focused into a material (e.g., fused silica) and through strong self-phase modulation generates an ultrabroadband (white light) source extending over the range of wavelengths over which the DC-OPCPA can be tuned. The desired operational wavelength can then be selected from this white light source.

In order to amplify the ultrashort pulses to high energy, they need to first be stretched temporally, amplified, and then recompressed. This general process is known as chirped pulse amplification (CPA). To accommodate a changing operational wavelength, both the stretcher and compressor needs to be tunable.

DETAILED DESCRIPTION

Figure 1:
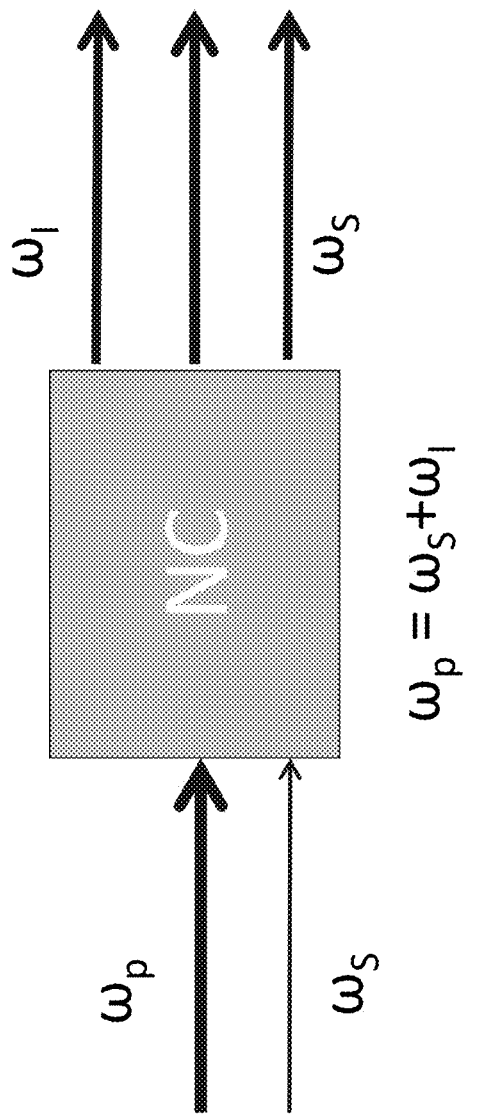
FIG. 1 is a block schematic illustrating aspects of optical pump amplification (OPA) of a source laser pulse in accordance with the prior art.
Figure 2:
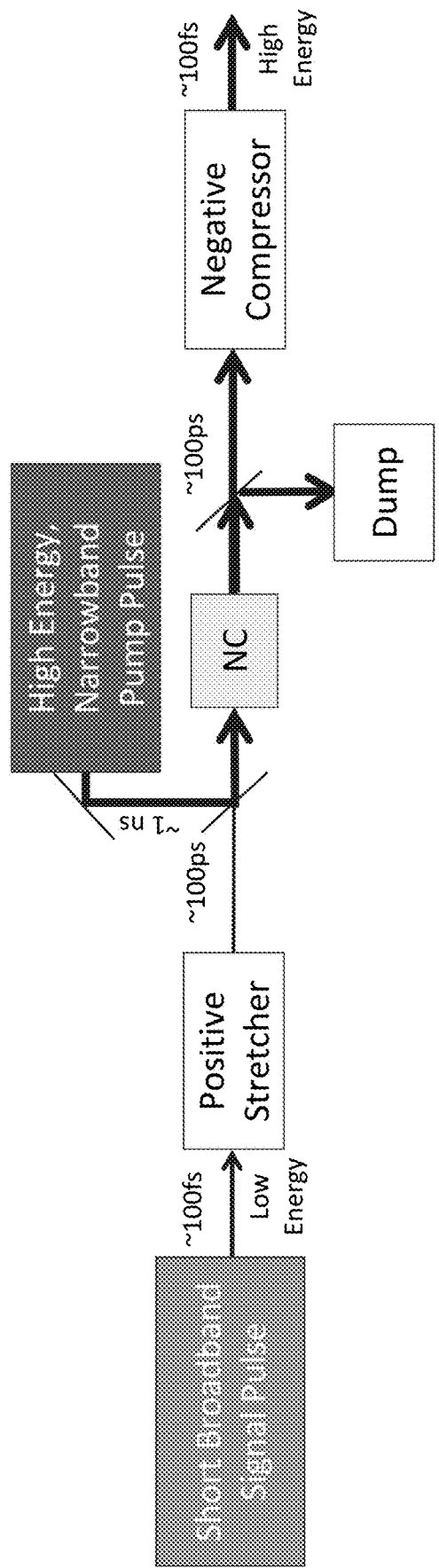
FIG. 2 is a block schematic illustrating aspects of optical parametric chirped pulse amplification (OP-CPA) of a source laser pulse in accordance with the prior art.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a high efficiency, tunable, high-contrast, broad-bandwidth laser amplifier with carrier envelope phase locking that can enable the generation of short high-power laser pulses at wavelengths where appropriate gain materials do not exist.

The laser amplifier scheme of the present invention, Dual Chirp Optical Parametric Chirped Pulse Amplification (DC-OPCPA), utilizes a high-energy, chirped pulse as a pump to amplify lower frequency, broadband pulses within a nonlinear crystal. The amplification is done within a second-order nonlinear material under difference frequency generation or optical parametric amplification arrangements known in the art. However, as described in more detail below, the use of a single initial pulse to produce oppositely signed chirped pump and signal pulses is a new feature of the DC-OPCPA scheme in accordance with the present invention, and leads to the generation of an idler pulse having increased bandwidth from the initial signal pulse, where the idler pulse which enables passive carrier envelope phase (CEP) locking. For a positively chirped pump and negatively chirped signal, a positively chirped idler pulse is produced that can be compressed using standard dispersive optical elements. In addition, as described in more detail below, the laser amplifier scheme in accordance with the present invention further includes a novel tunable pulse stretcher/compressor that enables the length of the pulse to be tuned over the transmission region of the nonlinear second-order material. This is achieved by allowing both the stretcher/compressor systems to be designed to allow for both rotation and changes in the grating separation.

The present invention provides a new laser architecture for selectively producing short high-energy laser pulses having octave-spanning, continuous tunability. Unlike the prior art techniques for pulse amplification discussed above, in accordance with the present invention, two oppositely chirped pulses are used in combination with a pair of the novel tunable pulse stretcher/compressors of the present invention to produce a short, high-energy, tunable, broadband pulse.

The envisioned mode of operation is that for signal amplification that a positive chirp is applied, the signal is amplified and then recompressed. For idler amplification, a negative chirp is applied to the signal, that generates an amplified positively chirped idler, and then the idler is compressed.

A tunable DC-OPCPA system in accordance with the present invention requires (1) a broad-bandwidth, ultrashort seed pulse and (2) a tunable pulse stretcher and compressor to access the various operational wavelengths. The seed pulse can be provided by means of supercontinuum generation, wherein a small portion of an initial high energy broadband pump pulse can be compressed to generate a low energy ultrashort pulse. This ultrashort pulse can be focused into a material (e.g., fused silica) and through strong self-phase modulation generates an ultrabroadband (white light) source extending over the range of wavelengths over which the DC-OPCPA can be tuned. The desired operational wavelength can then be selected from this white light source.

In order to amplify the ultrashort pulses to high energy, they need to first be stretched temporally, amplified, and then recompressed. This general process is known as chirped pulse amplification (CPA). To accommodate a changing operational wavelength, both the stretcher and compressor needs to be tunable.

Figure 3A:
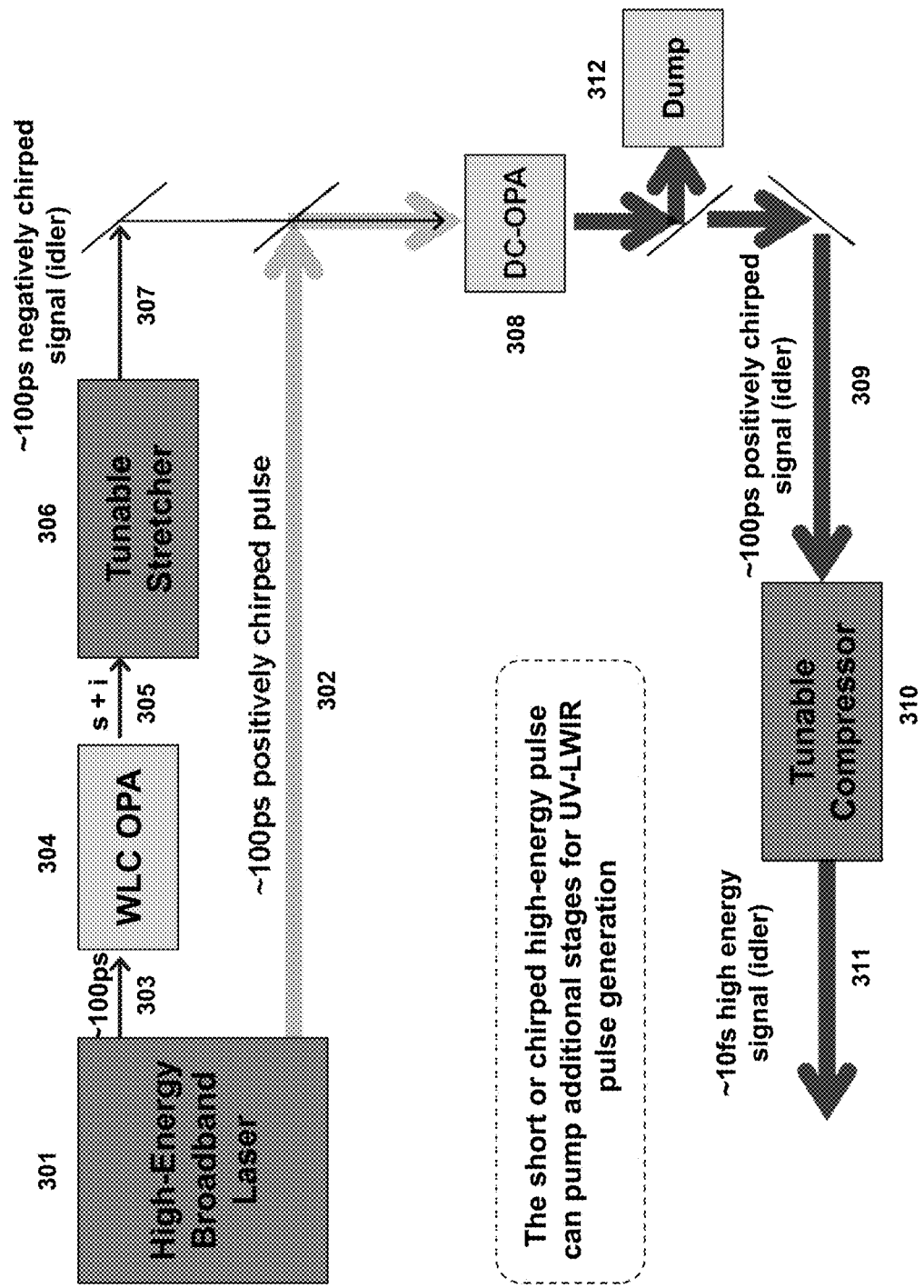
FIGS. 3A and 3B are block schematics illustrating aspects of a Dual-Chirp Optical Parametric Chirped Pulse Amplification (DC-OPCPA) system for amplification of a source laser pulse in accordance with the present invention.
Figure 3B:
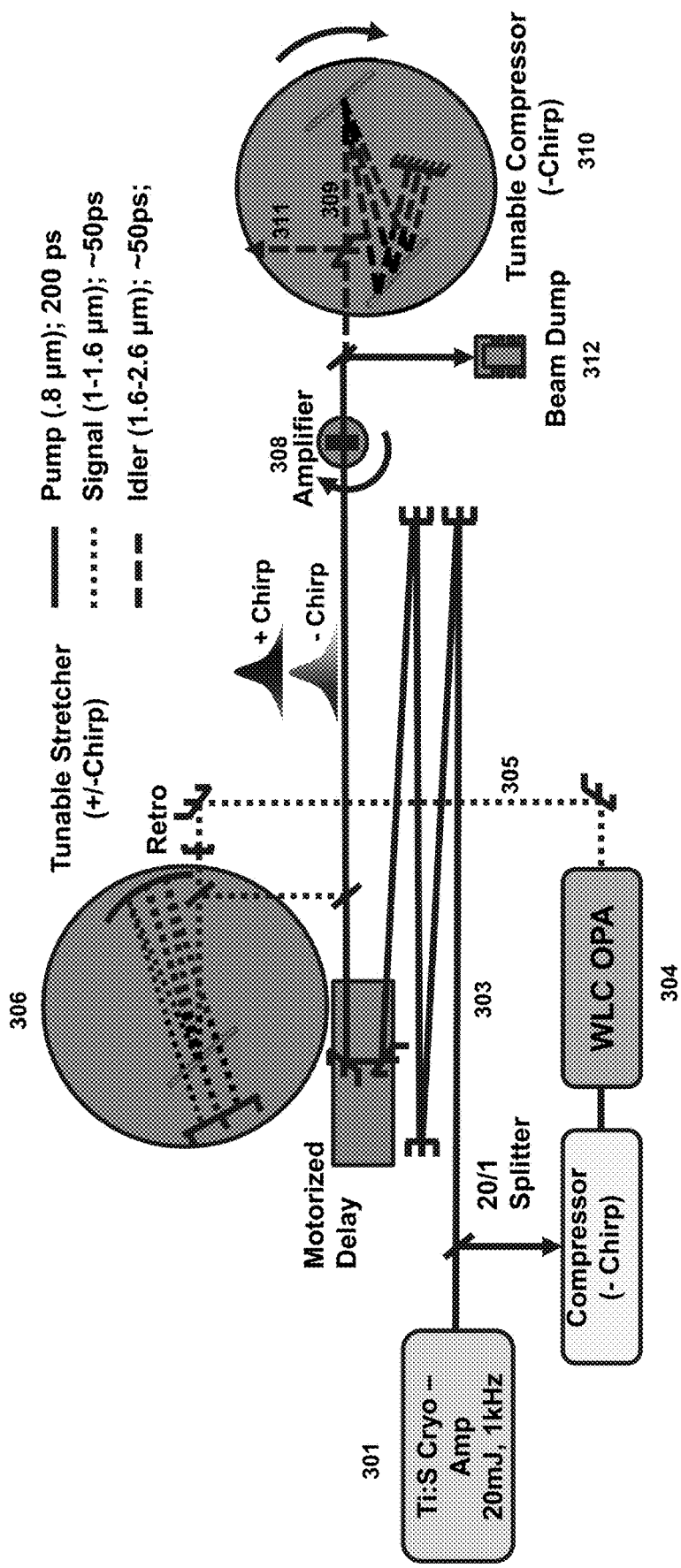

The block schematics in FIGS. 3A and 3B illustrate aspects of the novel laser architecture and method for selectively producing short high-energy laser pulses in accordance with the present invention.

As illustrated in FIGS. 3A and 3B, the laser architecture used in the method of the present invention includes a high-energy broadband laser source 301, a white light continuum optical parametric amplifier (WLC OPA) 304, a tunable stretcher 306, a dual-chip optical parametric amplifier (DC OPA) 308, and a tunable compressor 310.

As illustrated in FIGS. 3A and 3B, broadband laser source 301 emits a high-energy broadband pump pulse 302 having a frequency $\omega_p$ and a pulse length on the order of about 100 to about 200 ps. In the exemplary case described herein pulse 302 is positively chirped, but the method and apparatus in accordance with the present invention can also process a negatively chirped pulse in a manner comparable to that described herein. In accordance with the present invention, a small portion of the energy from this pulse is split off and is then compressed and used to generate a white light continuum (WLC). WLC is a nonlinear process where a short pulse is propagated through a material (e.g., fused silica) where it undergoes strong self-phase modulation. This leads to significant enhancement of the pulse's spectral bandwidth, producing the wavelengths necessary to seed the amplifier system. The WLC process produces a seed pulse referred to herein as signal pulse 303, having a frequency $\omega_s$ and a pulse length on the order of about 10 fs. See Jiun-Cheng Wang and Juen-Kai Wang, "Experimental and theoretical analysis of white-light seeded, collinear phase-matching, femtosecond optical parametric amplifiers," *J. Opt. Soc. Am. B* 21, 45-56 (2004). Signal pulse 303 can be used as is, or it can be further amplified through OPA 304 to produce an amplified signal (idler) (s+i) pulse 305 having both the original signal pulse energy plus a small amount of idler energy. Signal (idler) pulse 305 is then input into tunable pulse stretcher 306 where is it selectively stretched and chirped to produce negatively chirped signal (idler) pulse 307 having a pulse length on the order of about 100 ps.

Positively chirped initial pump pulse 302 and negatively chirped signal (idler) pulse 307 are then directed into dual-chirp optical parametric amplifier (DC-OPA) 308 which contains the novel tunable stretcher/compressor described below, that can actively adjust allowing for operation at varying wavelengths. Both the signal and idler are amplified in DC-OPA 308 until the pump energy begins to deplete, with the signal and idler mixing to produce a high-energy, positively chirped idler (signal) pulse 309 having a frequency $\omega_i=\omega_p-\omega_s$ and a pulse length on the order of about 100 ps. This idler pulse has a spectral bandwidth that is greater than that of both the pump and the signal, and further has a pulse-to-pulse stable carrier envelope phase (CEP) offset because both the pump and signal arise from a single pulse and therefore have a fixed phase difference.

Pulse 309 is then directed into tunable compressor 310, where it is compressed to produce the final short, compressed high-energy pulse 311 having a pulse length on the order of about 10 fs, while the residual energy from the pump pulse 302 and signal (idler) pulse 307 are output into energy dump 312.

As noted above, this short high-energy pulse is generated from the initial longer, lower-energy pulse through the use of a pair of novel tunable pulse stretcher/compressors in accordance with the present invention that can selectively operate at varying wavelengths.

Figure 4:
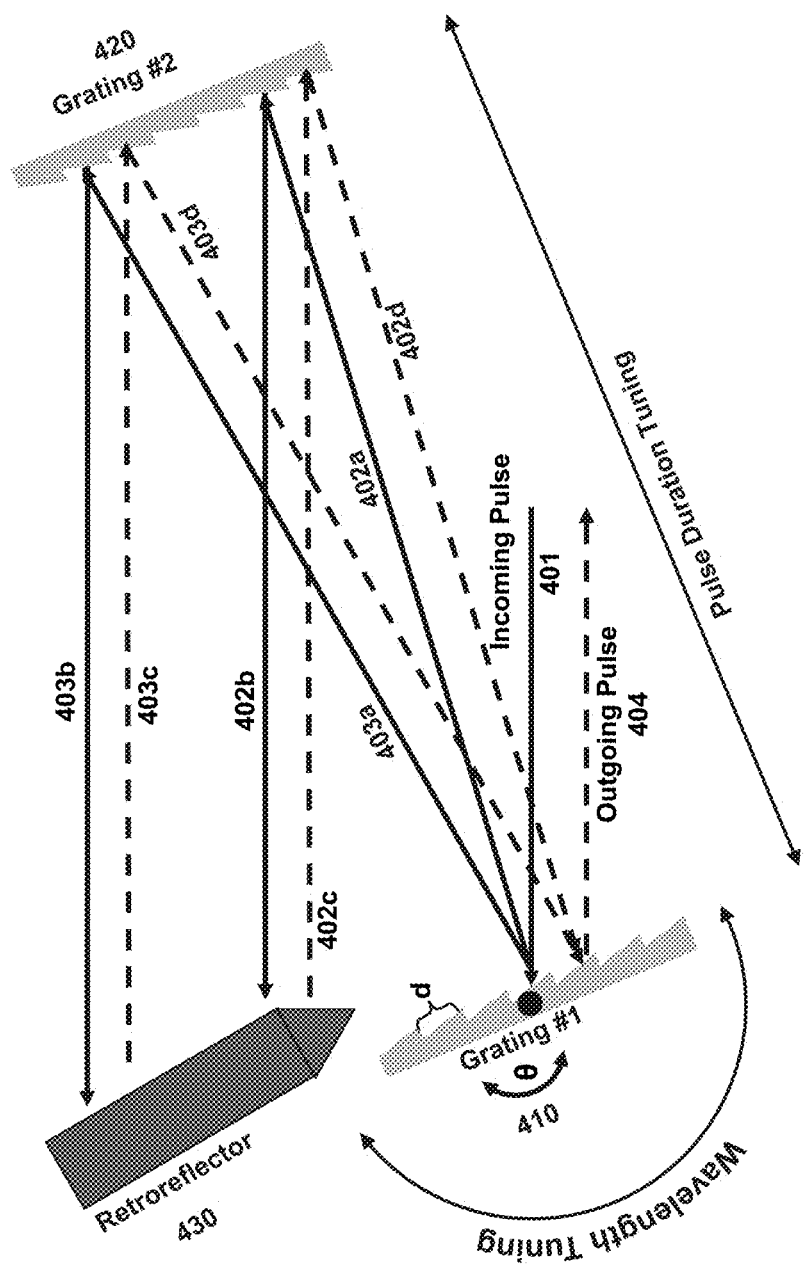
FIG. 4 is a block schematic illustrating aspects of a tunable pulse stretcher used in a DC-OPCPA system in accordance with the present invention.

The block schematic in FIG. 4 illustrates aspects of the novel tunable pulse stretcher/compressor in accordance with the present invention.

In the exemplary embodiment illustrated in FIG. 4, a tunable pulse/stretcher in accordance with the present invention incorporates a two-grating pulse stretcher, but other dispersion based stretchers such as prism-based or multi-grating stretcher could also be used.

Thus, as illustrated in FIG. 4, in an exemplary embodiment, two gratings 410 and 420 are used to spatially disperse and collimate the frequency content of an incoming broadband pulse 401. Thus, as illustrated in FIG. 4, incoming pulse 401 is reflected from grating 410 and is fanned out into a continuous spectrum having multiple frequency components such as frequency components 402a and 403a, which are reflected from grating 410 at different angles relative to the grating. Frequency components 402a and 403a reflect off grating 420 such that they travel in a parallel path, shown in FIG. 4 by lines 402b/403b. Grating 410 directs frequencies 402b/403b to retroreflector 430, which reflects the pulses back into grating 420 as frequency components 402*c*/403*c*. Grating 420 then reflects frequency components 402*c*/403*c* back to grating 410 as frequency components 402*d*/403*c*. Finally, grating 410 reflects frequency components 402*d*/403*d* onto the same path producing output pulse 404. The different path lengths traveled by the frequency components 402/403 results in a relative time delay between the frequency components. For a continuous spectrum, this results in an elongated pulse with a temporal frequency dependence, or "chirp." By tuning the angle θ of grating 410 with respect to the initial pulse 401 and the separation (d) between gratings in each of gratings 410 and 420, the pulse stretcher/compressor can be selectively tuned to process input pulses having various wavelengths and to produce output pulses having predetermined chirp rates.

The use of such an adjustable pulse stretcher deviates from prior art CPA architectures, and its tunability is key for optimizing the DC-OPCPA process in accordance with the present invention. While prior art architectures often use a final pulse compressor, such a compressor architecture is typically reserved for compression of the final pulse because although it can compress high energy pulses, it can only introduce a negative chirp. A positive chirp architecture is more complicated, limiting tunability and pulse energy and is thus reserved as the stretcher to compliment the negative chirp architecture for the compressor. For DC-OPCPA, the required positive chirp for compression is produced by the nonlinear interaction.

Figure 5:
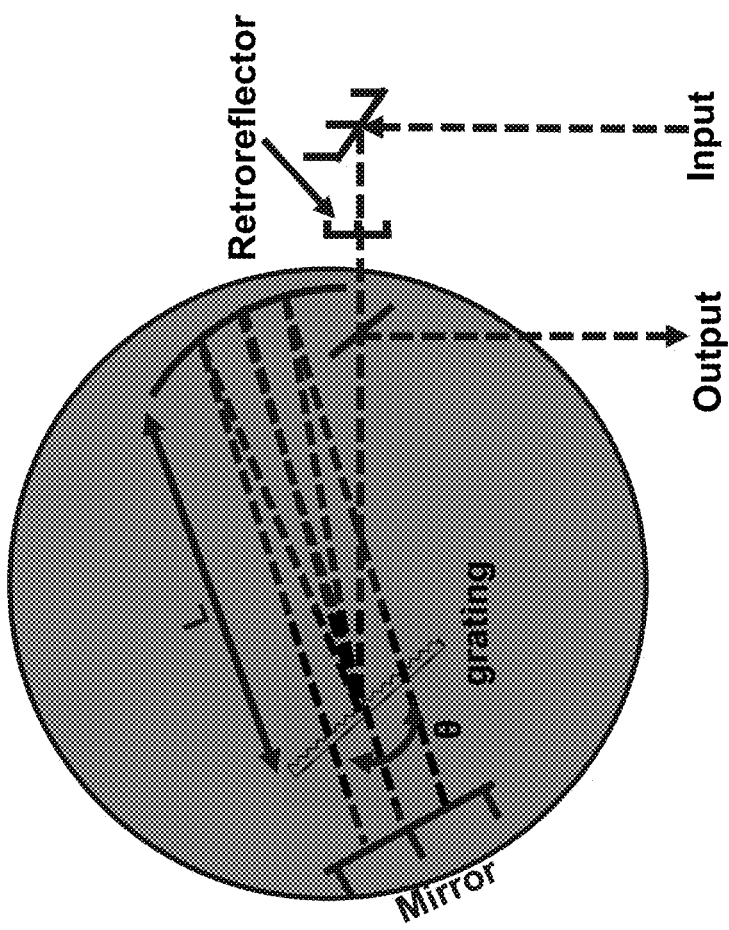
FIG. 5 is a block schematic further illustrating aspects of a tunable pulse stretcher used in a DC-OPCPA system in accordance with the present invention.

A basic design of the stretcher is further illustrated by the block schematic shown in FIG. 5. In the stretcher, the grating angle θ, i.e., the angle of the grating relative to the incident pulse, is used to tune the wavelength of the stretched pulse, while the separation L between the grating and the curved mirror is used to control the chirp. The operational wavelength is changed by rotating the grating, while the chirp is changed by changing the separation between the curved mirror and the grating. In this arrangement both positive and negative chirps can be applied, however it is not suitable for high energy pulses and thus reserved for as a stretcher. The change in the distance L changes the relative path lengths traveled by different frequency components, allowing access to varying chirp rates. In this arrangement, an L less than the focal length of the mirror produces a positive chirp, while an L greater than the focal length produces a negative chirp.

Figure 6:
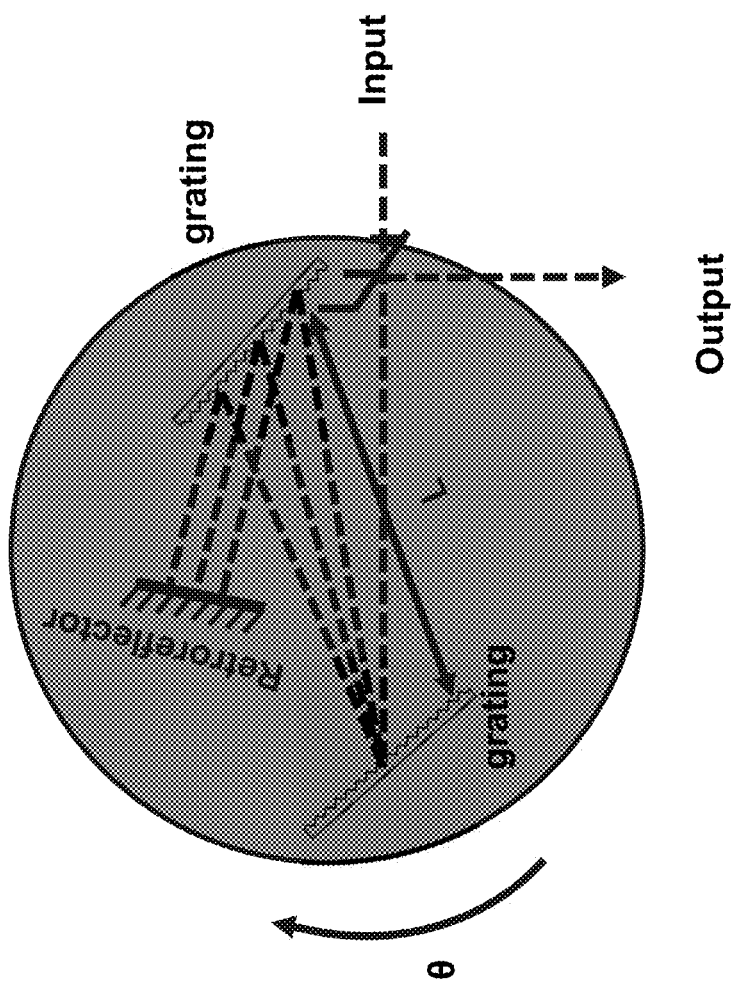
FIG. 6 is a block schematic further illustrating aspects of a tunable pulse compressor used in a DC-OPCPA system in accordance with the present invention.

The basic compressor design is shown in FIG. 6. The operational wavelength is changed by rotating the setup about the first grating. The chirp is adjusted by changing the distance between the first grating and the second grating/retroreflector pair. In this arrangement only negative chirps can be applied, however it can handle high energy pulses and so can be used for pulse compression. As with the pulse stretcher described above, the angle θ between the input pulse and the first grating can be tuned to produce a predetermined wavelength of the compressed pulse, while the separation L between the first grating and the second grating can be tuned to control the chirp, wherein an increase in L leads to an increase in the negative chirp. The whole setup is rotated about the center axis of the first grating to maintain alignment through the whole system.

EXAMPLES

2-D axisymmetric simulations of pulse generation in accordance with the present invention were run with the MATLAB Sandia Nonlinear Optics (mlSNLO) code. The simulation used a positively chirped, 800 nm pump and a negatively chirped, 1500 nm signal in a 7 mm, type I beta barium borate (BBO) crystal to produce a positively chirped 1714 nm idler and amplified signal pulse. The pump parameters are 2.0 J, 200 ps with 18 THz of bandwidth (chirp parameter 0.09 THz/ps), while the signal parameters are 2.4 mJ, 100 ps also with 18 THz of bandwidth (chirp parameter −0.18 THz/ps).

Figures 7A, 7B:
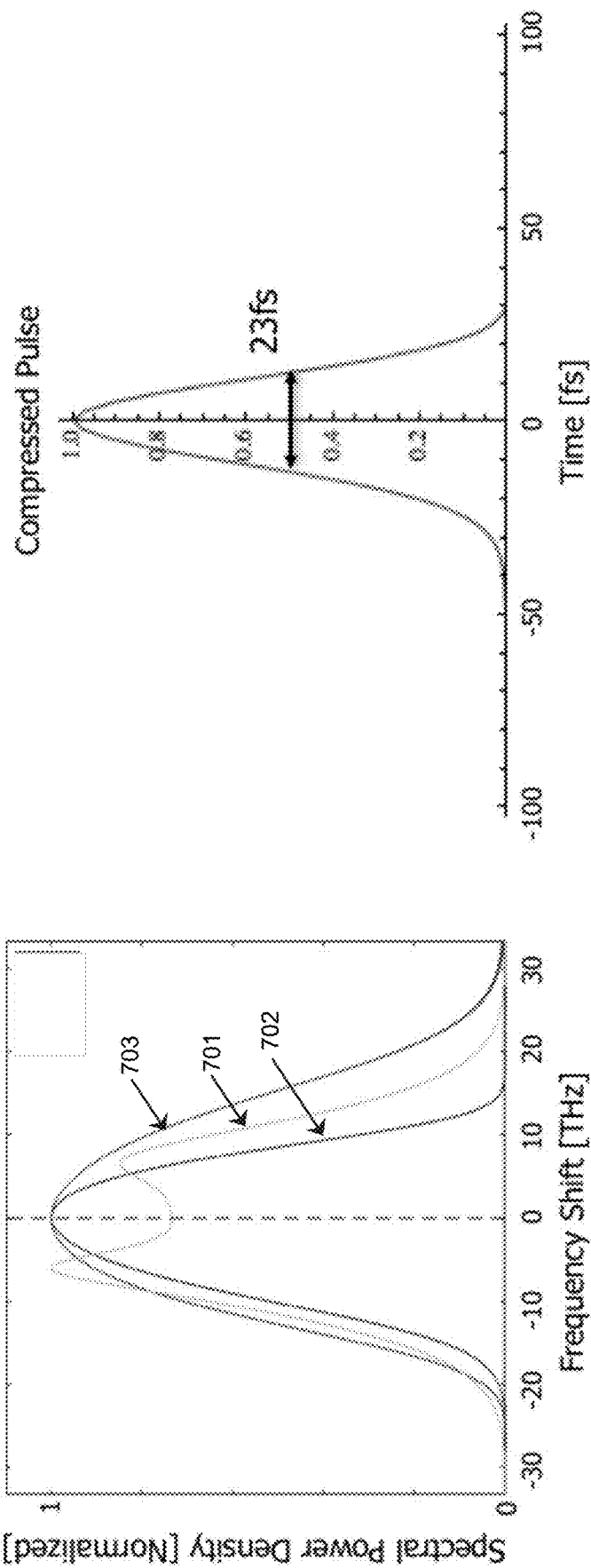
FIGS. 7A and 7B are plots showing the results of a simulation of pulse amplification and compression using dual-chirp optical pulse amplification (DC-OPCPA) in accordance with the present invention.

The results of this simulation are shown in FIGS. 7A and 7B.

FIG. 7A is a plot of the normalized spectral power density of the pump (701), signal (702), and idler (703). Depletion of the pump energy can be observed as a dip in the pump spectrum, and a slight increase in spectrum. While the signal maintains its spectrum, the resulting idler pulse's spectrum is larger than both the pump and the signal. From the simulation, the amplified signal is 247 mJ, 100 ps, with 18 THz of bandwidth (chirp parameter −0.18 THz/ps), while the idler is 214 mJ, 100 ps, with 28 THz of bandwidth (chirp parameter 0.28 THz/ps). FIG. 7B shows the result when the chirp is removed from the idler pulse. The idler's pulse duration is reduced from 100 ps to 23 fs, shorter than both the pump and signal when they are individually compressed.

Simulated runs were also made at other signal wavelengths. The resulting pulse energy for the signal and idler pulses is summarized in Table I below:

TABLE I

| Signal (nm) | Idler (nm) | Es (mJ) | Ei (mJ) |
| --- | --- | --- | --- |
| 1500 | 1714.3 | 247 | 214 |
| 1400 | 1866.6 | 207 | 153 |
| 1300 | 2080 | 139 | 85.6 |
| 1200 | 2400 | 50 | 23.8 |

The amplified, positive chirped idler is then directed into a simulated tunable pulse compressor in accordance with the present invention that can selectively compress the pulse to provide a predetermined pulse power and/or pulse duration. Through tuning of the compressor, the CEP of the passively locked idler can be actively tuned. See E. Treacy, "Optical pulse compression with diffraction gratings," in *IEEE Journal of Quantum Electronics*, vol. 5, no. 9, pp. 454-458 (1969). Assuming an efficiency of about 70%, CEP pulses having a power of about 10 TW can be tunably produced from initial pulses having a wavelength of 1.6-2.6 µm. The same scheme can be applied using a negatively chirped idler pulse to produce an ~10 TW tunable signal from initial pulses having a wavelength of about 1.1-1.6 µm. Either of these pulses can be frequency converted through either harmonic generation or OPA/OPCPA/DC-OPCPA to generate tunable pulses in the visible or mid-wave through long-wave infrared, respectively.

Advantages and New Features

This technique combines the benefits of both OPA and OPCPA technology with the addition of active CEP control and increased bandwidth that leads to potentially shorter, transform-limited pulses. In summary, DC-OPCPA produces high-energy, high-contrast pulses with increased bandwidth at high quantum efficiency allowing operation at high average powers. Combined with tunable stretcher/compressors, the system supports tunable, ultrashort pulses, with active CEP management of the idler pulse without the complication of a CEP controlled pump system. Such an approach is general and can be adapted to any chirped laser system operating at arbitrary wavelengths and repetition rate.

Alternatives

As discussed above, OPA and OPCPA are the only alternatives that do not rely on a lasing material. There are no known lasing materials that can possibly provide the tunability that this system provides. OPA is limited to lower intensity pulses while OPCPA is limited by seed pulses, reduced bandwidth, and does not provide CEP locking.

In cases where beam quality is a concern, the idler can be first produced in a pre-amp, spatially filtered and then used to seed a final amplifier.

There is no known technique that provides the flexibility of this approach for producing high power laser pulses.

The present disclosure describes various particular aspects, embodiments and features of an architecture and method for producing compressed, high-power laser pulses. Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A method for selectively producing a short high-energy laser pulse having a predetermined wavelength and a predetermined positive or negative chirp, comprising:
    emitting, from a broadband laser source, a first laser pulse, the first laser pulse being a high-energy broadband pump pulse having a predetermined pump pulse frequency $\omega_p$, a predetermined pump pulse length, and a predetermined positive or negative chirp;
    splitting off a predetermined amount of energy from the first laser pulse to form a second laser pulse;
    directing the second laser pulse though a white light continuum optical parametric amplifier (WLC OPA) that receives the second laser pulse, the WLC OPA containing a nonlinear material that produces self-phase modulation and enhancement of a spectral bandwidth of the second laser pulse as it travels through the nonlinear material so as to produce a first signal pulse from the second laser pulse, the first signal pulse having a predetermined signal pulse frequency $\omega_s$ and a first predetermined signal pulse length;
    amplifying the first signal pulse in the WLC OPA to produce an first signal (idler) pulse having the energy of the first signal pulse plus a predetermined amount of idler energy supplied during amplification;
    directing the first signal (idler) pulse into a tunable pulse stretcher that selectively stretches and applies a predetermined negative or positive chirp to the first signal (idler) pulse to produce a stretched and chirped second signal (idler) pulse having a predetermined signal (idler) pulse length and a chirp that is opposite the chirp of the pump pulse;
    directing the pump pulse and the second signal (idler) pulse into a dual-chirp optical parametric amplifier (DC-OPA) that contains a tunable stretcher/compressor, the DC-OPA amplifying and mixing the signal and idler energies of the second signal (idler) pulse to produce an idler (signal) pulse having a frequency $\omega_i = \omega_p - \omega_s$ and a predetermined idler (signal) pulse length, the idler (signal) pulse having a chirp that is the same as the chirp of the pump pulse and having a spectral bandwidth that is greater than a spectral bandwidth of the first pulse and a spectral bandwidth of the second pulse; and
    directing the idler (signal) pulse into a tunable pulse compressor; wherein the tunable pulse compressor compresses the idler (signal) pulse into a final compressed pulse having a final predetermined energy and a final predetermined pulse length.

2. An apparatus for selectively producing a short high-energy laser pulse having a predetermined wavelength and a predetermined positive or negative chirp, comprising:
    a broadband laser source that emits a first laser pulse, the first laser pulse being a high-energy broadband pump pulse having a predetermined pump pulse frequency $\omega_p$, a predetermined pump pulse length, and a predetermined positive or negative chirp, part of the energy from the first laser pulse being split off to form a second laser pulse;
    a white light continuum optical parametric amplifier (WLC OPA) that receives the second laser pulse, the WLC OPA containing a nonlinear material that produces self-phase modulation and enhancement of a spectral bandwidth of the second laser pulse as it travels through the nonlinear material so as to produce a first signal pulse from the second laser pulse, the first signal pulse having a predetermined signal pulse frequency $\omega_s$ and a first predetermined signal pulse length,
    the OPA portion of the WLC OPA receiving and amplifying the first signal pulse to produce an first signal (idler) pulse having the energy of the first signal pulse plus a predetermined amount of idler energy supplied during amplification;
    a tunable pulse stretcher that receives the first signal (idler) pulse, the tunable pulse stretcher selectively stretching and applying a predetermined negative or positive chirp to the first signal (idler) pulse to produce a stretched and chirped second signal (idler) pulse having a predetermined signal (idler) pulse length and a chirp that is opposite the chirp of the pump pulse;
    a dual-chirp optical parametric amplifier (DC-OPA) that receives the second signal (idler) pulse, the DC-OPA containing a tunable stretcher/compressor comprising nonlinear second-order material, the tunable stretcher/compressor amplifying and mixing the signal and idler energies of the second signal (idler) pulse to produce an idler (signal) pulse having a frequency $\omega_i = \omega_p - \omega_s$ and a predetermined idler (signal) pulse length, the idler (signal) pulse having a chirp that is the same as the chirp of the pump pulse and having a spectral bandwidth that is greater than a spectral bandwidth of the first pulse and a spectral bandwidth of the second pulse; and
    a tunable pulse compressor that receives the idler (signal) pulse;
    wherein the tunable pulse compressor compresses the idler (signal) pulse into a final compressed pulse having a final predetermined energy and a final predetermined pulse length; and
    wherein the pulse length of the final compressed pulse is tuned over a transmission region of the nonlinear second-order material in the DC OPA.

* * * * *